(12) United States Patent  (10) Patent No.: US 8,194,349 B2
Sato  (45) Date of Patent: Jun. 5, 2012

(54) RECORDING MEDIUM CARTRIDGE AND TAKEOUT MANAGEMENT SYSTEM

(75) Inventor: Junichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 101 days.

(21) Appl. No.: 12/805,649

(22) Filed: Aug. 11, 2010

(65) Prior Publication Data

US 2010/0309582 A1  Dec. 9, 2010

Related U.S. Application Data

(63) Continuation of application No. PCT/JP2008/055066, filed on Mar. 19, 2008.

(51) Int. Cl.
*G11B 23/107* (2006.01)
(52) U.S. Cl. ........................................ 360/132
(58) Field of Classification Search .................. 360/132, 360/133
See application file for complete search history.

(56) References Cited

U.S. PATENT DOCUMENTS

| | | | |
|---|---|---|---|
| 6,275,151 B1 * | 8/2001 | Gehlot | 340/541 |
| 6,633,454 B1 * | 10/2003 | Martin et al. | 360/132 |
| 2006/0077585 A1 * | 4/2006 | Larson | 360/69 |
| 2007/0013538 A1 * | 1/2007 | Dalzell | 340/652 |
| 2007/0112762 A1 * | 5/2007 | Brubaker | 707/5 |
| 2008/0170330 A1 * | 7/2008 | Asano | 360/132 |

FOREIGN PATENT DOCUMENTS

| | | |
|---|---|---|
| JP | 11-69023 | 3/1999 |
| JP | 2004-46939 | 2/2004 |
| JP | 2004-171243 | 6/2004 |
| JP | 2004-288004 | 10/2004 |
| JP | 2007-11521 | 1/2007 |
| JP | 2007-234129 | 9/2007 |

OTHER PUBLICATIONS

International Preliminary Report on Patentability with the Written Opinion in International Application No. PCT/JP2008/055066, mailed on Nov. 11, 2010.
International Search Report for PCT/JP2008/055066, mailed Apr. 22, 2008.
Korean Office Action for corresponding Korean Patent Application No. 10-2010-7017014, mailed on May 17, 2011.

* cited by examiner

*Primary Examiner* — Jefferson Evans
(74) *Attorney, Agent, or Firm* — Staas & Halsey LLP

(57) ABSTRACT

A recording medium cartridge includes: a recording medium that is a magnetic tape recording information; a reel body including a central shaft that takes up the recording medium and two frame plates that sandwich the taken up recording medium and face each other in a direction along the central shaft; a communication section performing communications wirelessly; and a destruction mechanism that destroys, in response to reception of a predetermined wireless signal in the communication section, the recording medium at least to the extent that reading of information by a reading device reading information from the recording medium is impossible. The destruction mechanism includes: a heating element attached to at least one of the two frame plates and supplied with electric power to generate heat, and an electric power supply section supplying electric power to the heating element in response to the reception of the wireless signal in the communication section.

8 Claims, 13 Drawing Sheets

RECORDING MEDIUM CARTRIDGE AND TAKEOUT MANAGEMENT SYSTEM

CROSS-REFERENCE TO RELATED APPLICATION

This is a continuation application of PCT/JP2008/055066, filed on Mar. 19, 2008.

TECHNICAL FIELD

The present invention relates to a recording medium cartridge including a recording medium that records information and a takeout management system that manages taking the recording medium cartridge out of a storage location where such a recording medium cartridge is stored.

BACKGROUND ART

Conventionally, for example, information to be saved is stored in a recording medium, such as a magnetic tape and a DVD, and such a recording medium is stored in a predetermined location to store the information for a long time. Much of the information to be saved for a long time is information that requires strict security management, such as customer information in a company, and for example, to discard the recording medium where the information is recorded, an act, such as mechanically destroying the recording medium before discarding, is performed (for example, see Patent Citation 1).

Incidentally, a recording medium cartridge including a magnetic tape and the like capable of recording a large amount of information is widely used as a thing suitable for long-term storage of information. In general, takeout of such a recording medium cartridge is strictly managed from the viewpoint of the security management, and information leakage caused by illicit takeout of the recording medium cartridge from the storage location is prevented.

For example, the information leakage is also prevented by a method of, for example, recording information in a recording medium of a recording medium cartridge in a state in which reading is possible only by use of a predetermined software-like secret code key.

Furthermore, a so-called RFID (Radio_Frequency_IDentification) tag capable of wirelessly exchanging information is attached to a commodity to be managed so that an act such as managing takeout of the commodity is performed (for example, see Patent Citation 2), and such takeout management using the RFID tag is applied to the prevention of the information leakage.

The prevention of the information leakage using the RFID tag is performed, for example, as follows. First, to each recording medium cartridge in the storage location, a memory and an RFID tag storing identification information for distinguishing a recording medium cartridge from other recording medium cartridge are attached. Then, a security gate, which has a function for communicating with the RFID tags and stores identification information of recording medium cartridges prohibited from being taken out of the storage location, is installed at a gateway of the storage location. When a person carrying a recording medium cartridge passes through the security gate, the security gate queries the RFID tag of the recording medium cartridge carried by the person for an identification number. The security gate generates an alarm when the identification number provided by the RFID tag in response to the query is identification information of a recording medium cartridge prohibited from being taken out of the storage location. The actions by the RFID tags and the security gate prevent the information leakage caused by illicit takeout of recording medium cartridges from the storage location.

Patent Citation 1: Japanese Laid-open Patent Publication No. 2007-234129

Patent Citation 2: Japanese Laid-open Patent Publication No. 2004-288004

DISCLOSURE OF INVENTION

However, in the prevention of information leakage using the secret code key, it is technically impossible to completely prevent illicit deciphering of the secret code key at present, and there is a problem that if the secret code key is deciphered, the information leakage cannot be prevented. Furthermore, in the prevention of information leakage using the RFID tags and the security gate, for example, there is a possibility that if there is an unauthorized person ignoring the alarm and forcibly passing through the security gate, the information leakage by such an unauthorized person cannot be prevented.

In view of the foregoing circumstances, it is an object of the present invention to provide a recording medium cartridge capable of recording information in a state in which information leakage is prevented reliably and a takeout management system that manages taking a recording medium cartridge out of a storage location to prevent the information leakage with reliability.

The recording medium cartridge achieving the above object in a basic mode is a recording medium cartridge including:

a recording medium that records information;

a communication section that performs communications wirelessly; and a destruction mechanism that destroys, in response to reception of a predetermined wireless signal in the communication section, the recording medium at least to the extent that reading of information by a reading device that reads information from the recording medium is impossible.

According to the basic mode of the recording medium cartridge, when the communication section receives the wireless signal, the destruction mechanism destroys the recording medium. As a result, for example, an operation, such as sending the wireless signal to the recording medium cartridge when the recording medium cartridge is about to be illicitly taken out, can surely prevent information leakage even if there is an unauthorized person who forcibly takes out the recording medium cartridge. In other words, according to the basic mode of the recording medium cartridge, information can be recorded in a state in which information leakage is prevented with reliability.

With respect to the basic mode of the recording medium cartridge, an application mode in which "the destruction mechanism destroys the recording medium by heat" is preferable.

According to this preferable application mode, the recording medium can be destroyed by a simple method such as heating.

With respect to the basic mode of the recording medium cartridge, there is also a preferable application mode in which, "the recording medium is a magnetic tape, the recording medium cartridge further includes a reel body including a central shaft that takes up the recording medium and two frame plates that sandwich the taken up recording medium and face each other in a direction along the central shaft, and the destruction mechanism includes:

a heating element that is attached to at least one of the two frame plates and supplied with electric power to generate heat, and an electric power supply section that supplies electric power to the heating element in response to the reception of the wireless signal in the communication section."

According to this preferable application mode, a low heat-resistant magnetic tape is employed and the heating element that heats the magnetic tape in response to the reception of the wireless signal is used so that the recording medium can be destroyed in a simple manner. Therefore, the certainty of destruction of the recording medium can be increased.

With respect to the application mode of the type that uses the magnetic tape as the recording medium, an application mode in which "the heating element is attached to a part of the frame plate and crosses layers of the recording medium taken up by the central shaft" is further preferable.

According to this further preferable application mode, the heat from the heating element is applied to a range crossing the layers of the recording medium, although only to a part of the recording medium. Therefore, the partial heat can make the recording medium unusable throughout a wide range in the length direction, which is efficient.

The application mode of the type that uses the magnetic tape as the recording medium may be: an application mode in which "the heating element is a heater line that extends in a direction crossing the layers of the recording medium taken up by the central shaft, on the frame plate"; an application mode in which "the heating element is a plurality of heater lines that radially extend from the central shaft, on the frame plate"; or an application mode in which "the heating element is a plurality of heaters that are scattered on the frame plate, each of the heaters having a plane shape and a surface that generates heat, and the surface that generates the heat facing the recording medium taken up by the central shaft."

In any of these application modes, heating of the part of the recording medium can disable the recording medium throughout a wide range in the length direction of the recording medium and thus, the recording medium can be made unusable efficiently.

Further, a takeout management system in a basic mode achieving the above object is a takeout management system that manages takeout of one or more recording medium cartridges each including a recording medium that records information, from a storage location where the recording medium cartridges are stored, wherein:

the recording medium cartridge includes:
the recording medium,
a medium side communication section that performs communications wirelessly, and
a destruction mechanism that destroys, in response to reception of a predetermined wireless signal in the medium side communication section, the recording medium at least to the extent that reading of information by a reading device that reads information from the recording medium is impossible, and the takeout management system includes:
a gateway side communication section that is installed at a gateway to the storage location and wirelessly communicates with the medium side communication section of the recording medium cartridge passing through the gateway;
a determination section that determines whether the recording medium cartridge passing through the gateway is a recording medium cartridge prohibited from being taken out of the storage location, based on a content of communication with the medium side communication section by the gateway side communication section; and
a sending section that sends, through the gateway side communication section, the wireless signal to the recording medium cartridge determined by the determination section to be the recording medium cartridge prohibited from being taken out of the storage location.

According to the basic mode of the takeout management system, for the recording medium cartridge determined by the determination section to be a recording medium cartridge prohibited from being taken out of the storage location, the recording medium is destroyed. As a result, even if the recording medium cartridge prohibited from being taken out is forcibly taken out, information leakage can be surely prevented because the taken-out recording medium cartridge is in a state in which the recording medium is already destroyed. In other words, according to the basic mode of the takeout management system, taking the recording medium cartridge out of the storage location can be managed to surely prevent information leakage.

With respect to the basic mode of the takeout management system, there is a preferable application mode in which "the recording medium cartridge includes:

an identification name responding section that includes an identification name that distinguishes the recording medium cartridge from other recording medium cartridges and answers the identification name through the medium side communication section when the identification name is queried through the medium side communication section, and the determination section includes an identification name of the recording medium cartridge prohibited from being taken out of the storage location, gives the recording medium cartridge passing through the gateway a query through the gateway side communication section to find the identification name, and determines whether the identification name answered by the identification name responding section in response to the query matches an identification name of the recording medium cartridge prohibited from being taken out."

According to this preferable application mode, as a result of using the identification name, the recording medium cartridge prohibited from being taken out can be simply distinguished from other recording medium cartridges.

As for the takeout management system, only the modes specific to the takeout management system are described here. However, this is simply to avoid a repetition, and the takeout management system includes not only these specific modes, but various modes corresponding to the various modes of the recording medium cartridge.

As described above, according to the basic modes of the recording medium cartridge and the takeout management system, information can be recorded in a state in which information leakage is surely prevented, and taking a recording medium cartridge out of a storage location can be managed to surely prevent the information leakage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BEST MODE FOR CARRYING OUT THE INVENTION

A specific embodiment of the recording medium cartridge and the takeout management system described for the basic modes and the application modes will be described below with reference to the drawings.

Figure 1:
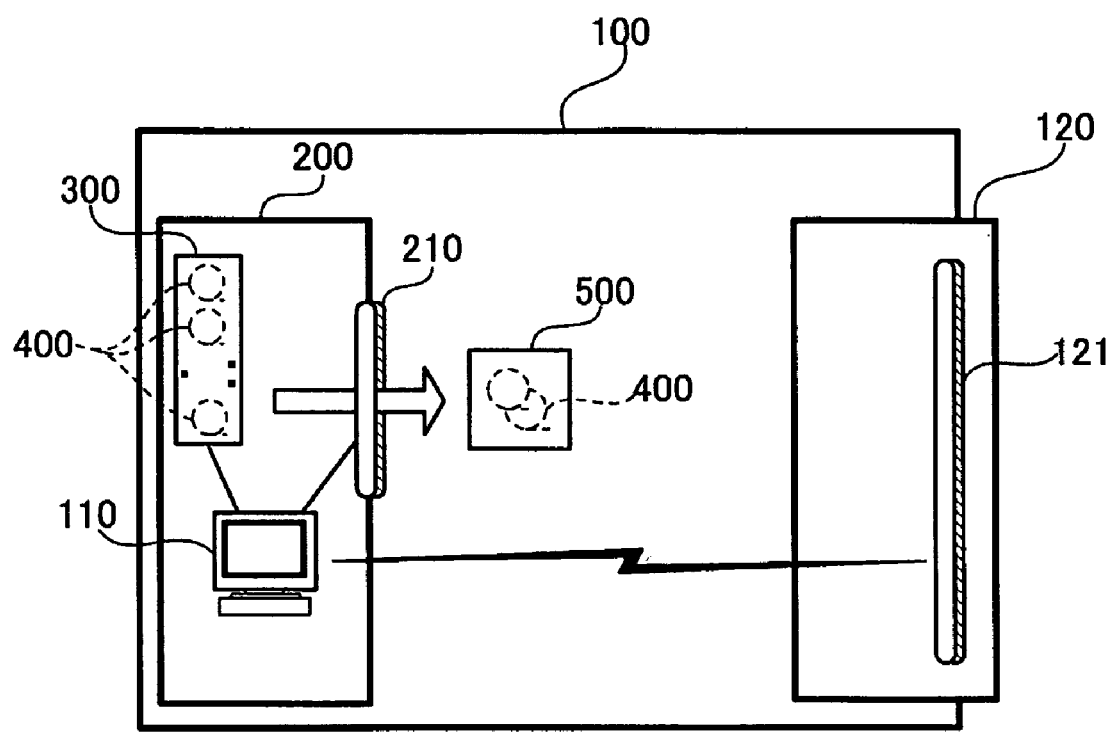
FIG. 1 is a diagram illustrating a specific embodiment for a recording medium cartridge and a takeout management system.

FIG. 1 is a diagram illustrating the specific embodiment of the recording medium cartridge and the takeout management system.

A computer room 200 is arranged inside a computer center 100 illustrated in FIG. 1 and further, a library device 300 storing tape cartridges 400 including magnetic tapes that record information is installed inside the computer room 200.

Here, in the present embodiment, to each of the tape cartridges 400 stored in the library device 300, an identification number for distinguishing the tape cartridge 400 from other tape cartridges 400 is allocated. Further, an RFID tag that wirelessly exchanges information with the outside is mounted on each of the tape cartridges 400. When there is a wireless query for the identification number from the outside, the RFID tag receives the query, and the RFID tag wirelessly provides the identification number of the cartridge in response to the query. In the present embodiment, each of the tape cartridges 400 includes a function of destroying the magnetic tape to make reading of information from the tape cartridge 400 impossible, thereby preventing leakage of the information recorded in the tape cartridge 400. The destruction of the magnetic tape based on the function is executed when a predetermined destruction signal for instructing the destruction of the magnetic tape to prevent leakage of information is wirelessly sent from the outside, and the RFID tag receives the destruction signal. The tape cartridge 400 will be described later in detail.

In recording of information onto the tape cartridge 400 stored in the library device 300, whether the information is confidential information, for which leakage from the computer center 100 needs to be prevented, is designated by a user operation. The computer room 200 includes a management computer 110 that manages, along with the library device 300, takeout of each of the tape cartridges 400 based on the identification number of each of the tape cartridges 400. For the tape cartridges 400 recording the confidential information, the identification numbers of these tape cartridges 400 are registered in the management computer 110 as identification numbers targeted for leakage prevention.

A checkpoint 120 where a guard resides is arranged at the gateway of the computer center 100 in FIG. 1, and a check device 121 that is used to check whether the identification number of the tape cartridge 400 is an identification number targeted for leakage prevention is installed at the checkpoint 120. The check device 121 includes a function of wirelessly communicating with the RFID tags mounted on the tape cartridges 400 and the management computer 110 in the computer room 200.

The tape cartridge 400 is equivalent to a specific embodiment of the recording medium cartridge, and a combination of the tape cartridge 400, the check device 121, and the management computer 110 is equivalent to a specific embodiment of the takeout management system. The tape cartridge 400 is also equivalent to an example of the recording medium cartridge in the basic mode of the takeout management system. Furthermore, the check device 121 is equivalent to an example of the gateway side communication section in the basic mode, and the management computer 110 is equivalent to an example serving both as the determination section and the sending section in the basic mode.

Figure 2:
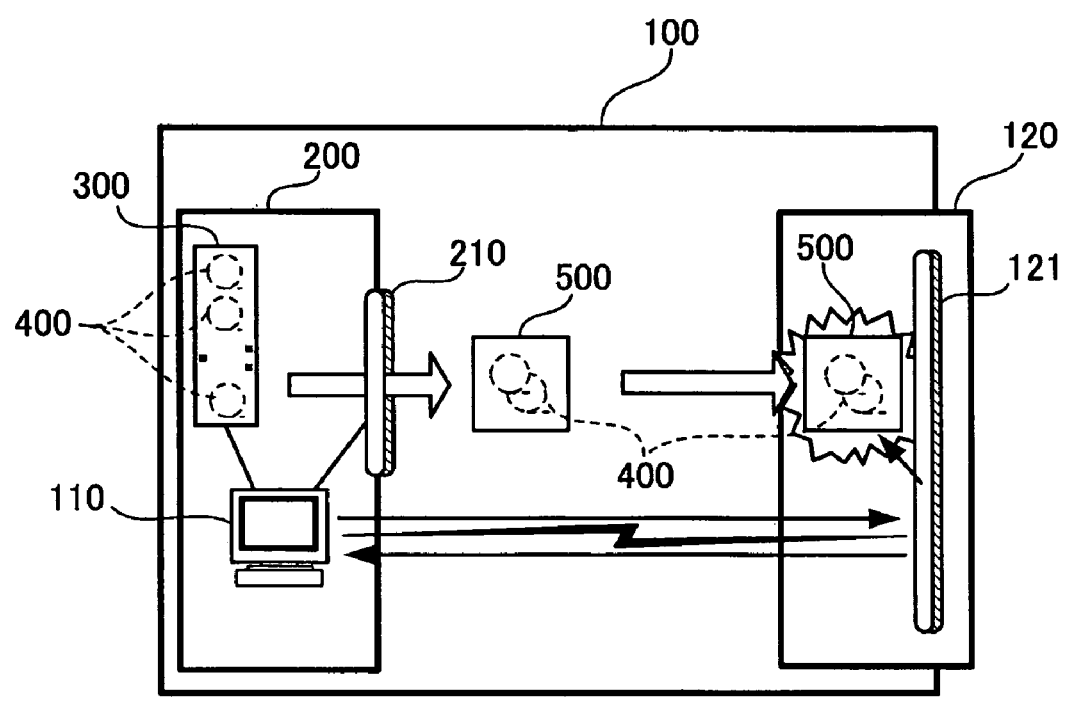
FIG. 2 is a schematic diagram illustrating a situation of checking an identification number at a checkpoint 120 of a computer center 100.

FIG. 2 is a schematic diagram illustrating a situation of checking the identification number at the checkpoint 120 of the computer center 100.

FIG. 2 illustrates a situation as an example of checking at the checkpoint 120, in which a person carrying the tape cartridge 400 in a state of being stored in a case 500 for transfer reaches the checkpoint 120, and the identification number of the tape cartridge 400 is checked in accordance with an instruction of the guard.

In this case, based on the instruction of the guard, the tape cartridge 400 in a state of being stored in the case 500 or in a state of being taken out of the case 500 is placed near the check device 121. Consequently, the management computer 110 wirelessly queries the tape cartridge 400 for the identification number through the check device 121. The management computer 110 then receives the identification number wirelessly sent from the tape cartridge 400 in response to the query through the check device 121.

Subsequently, the management computer 110 compares the received identification number with the currently registered identification numbers targeted for leakage prevention to check whether the received identification number is an identification number targeted for leakage prevention. If the identification number is an identification number targeted for leakage prevention, the management computer 110 sends a destruction signal to the tape cartridge 400 through the check device 121. As a result, the magnetic tape in the tape cartridge 400 recording the confidential information is destroyed, and leakage of the confidential information from the computer center 100 is prevented.

In the present embodiment, a measure similar to the prevention of information leakage at the checkpoint 120 described above is also taken at the gateway of the computer room 200.

Figure 3:
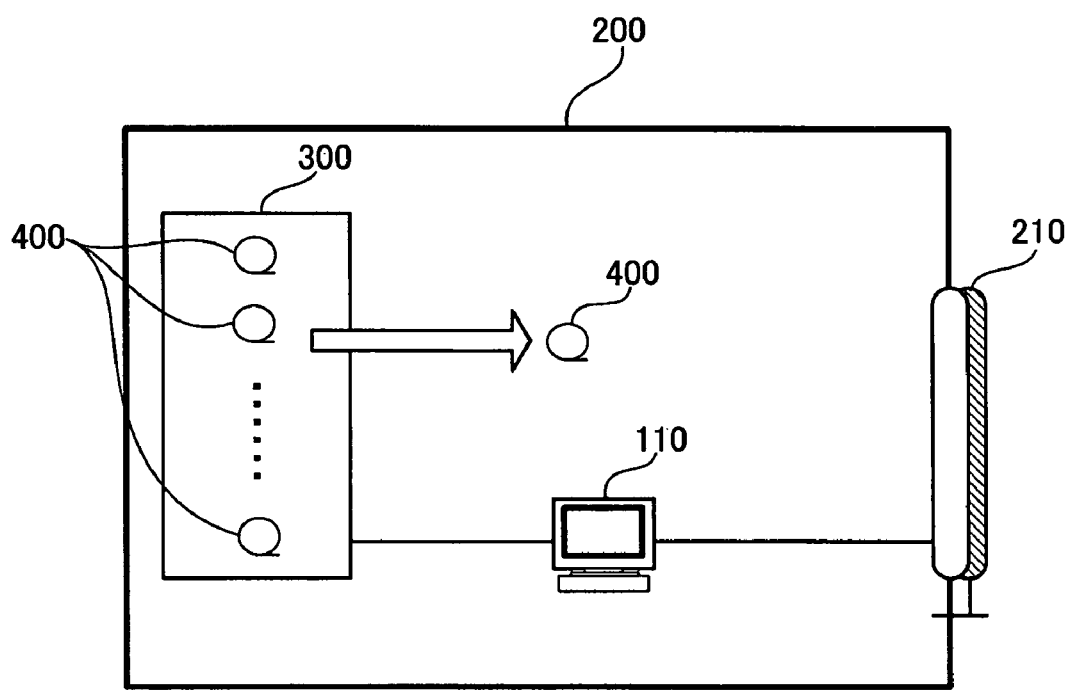
FIG. 3 is an enlarged view of a computer room 200 in FIG. 1.

FIG. 3 is an enlarged view of the computer room 200 in FIG. 1.

As also illustrated in FIG. 1, similar to the check device 121 installed at the checkpoint 120 of the computer center 100, a check gate 210 including a function of wirelessly communicating with the RFID tags mounted on the tape cartridges 400 is arranged at the gateway of the computer room 200. Meanwhile, in the present embodiment, the check gate 210 is connected to the management computer 110 by wire. While checking of the identification number at the checkpoint 120 is performed as the tape cartridge 400 or the case 500 is placed near the check device 121 based on the instruction of the guard, checking at the check gate 210 is performed as a person carrying the tape cartridge 400 passes through the check gate 210.

In the computer room 200, a combination of the tape cartridge 400, the check gate 210, and the management computer 110 is equivalent to a specific embodiment of the takeout management system. Furthermore, the check gate 210 is equivalent to an example of the gateway side communication section in the basic mode of the takeout management system, and the management computer 110 is equivalent to an example serving both as the determination section and the sending section in the basic mode.

Figure 4:
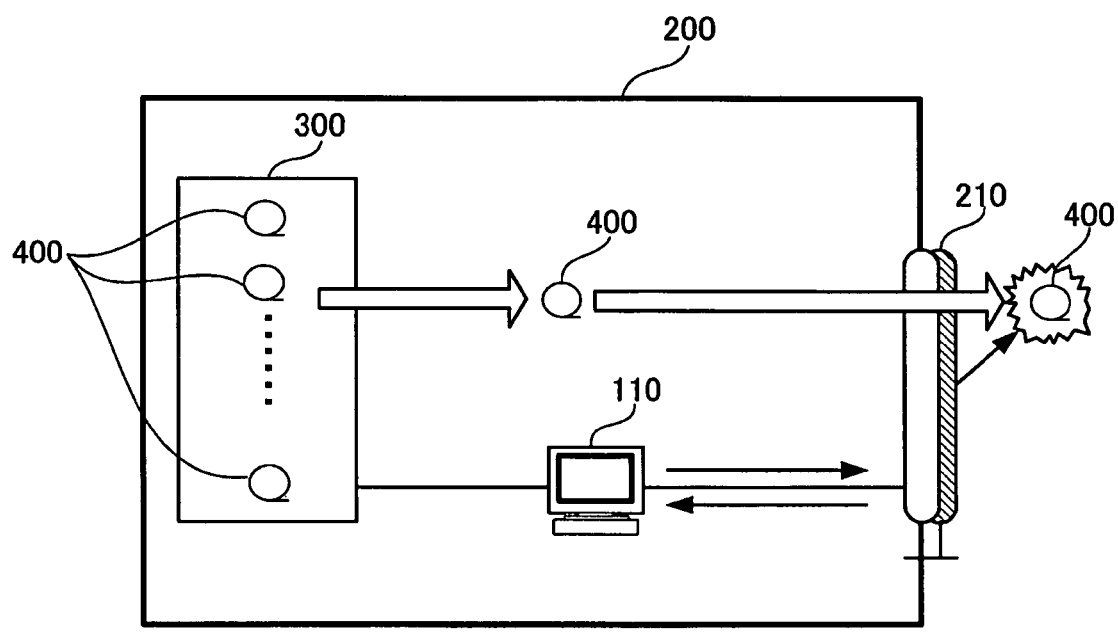
FIG. 4 is a schematic diagram illustrating a situation of checking an identification number at a check gate 210 of the computer room 200.

FIG. 4 is a schematic diagram illustrating a situation of checking the identification number at the check gate 210 of the computer room 200.

FIG. 4 illustrates a situation as an example of checking at the check gate 210, in which the identification number of the tape cartridge 400 is checked when a person carrying the tape cartridge 400 passes through the check gate 210.

In this case, the management computer 110 first wirelessly queries the tape cartridge 400 for the identification number through the check gate 210. The management computer 110 then receives the identification number wirelessly sent from the tape cartridge 400 in response to the query through the check gate 210.

Subsequently, the management computer 110 compares the received identification number with the currently registered identification numbers targeted for leakage prevention to check whether the received identification number is an identification number targeted for leakage prevention. If the identification number is an identification number targeted for leakage prevention, the management computer 110 sends the destruction signal to the tape cartridge 400 through the check gate 210. As a result, the magnetic tape in the tape cartridge 400 recording the confidential information is destroyed, and leakage of the confidential information from the computer room 200 is prevented.

Furthermore, in the present embodiment, the library device 300 also takes a measure similar to the prevention of information leakage at the checkpoint 120 and the check gate 210.

Figure 5:
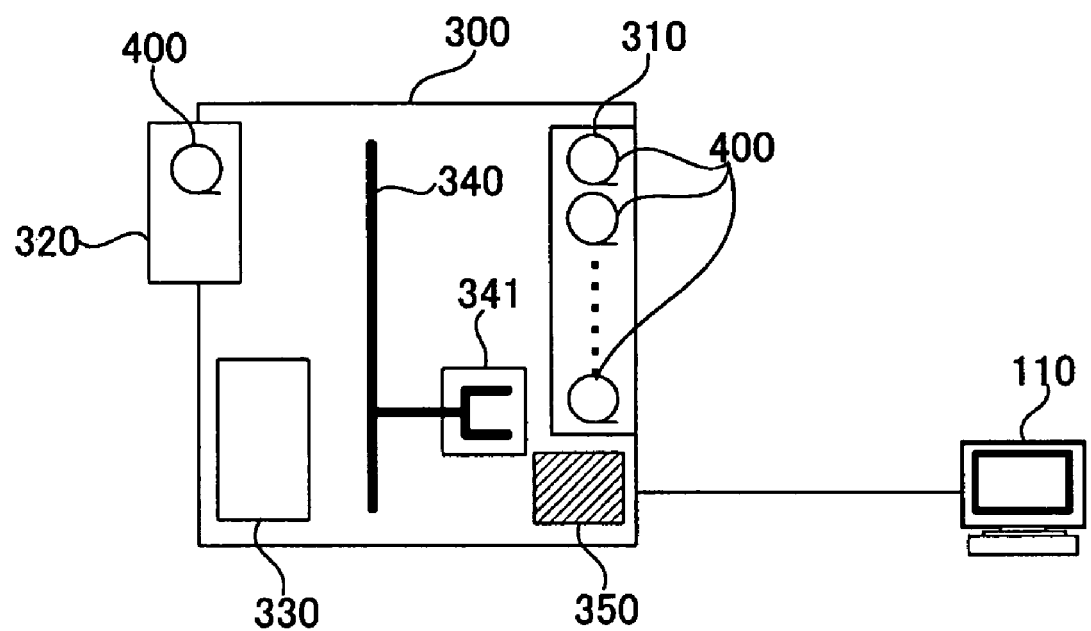
FIG. 5 is a diagram illustrating details of a library device 300.

FIG. 5 is a diagram illustrating details of the library device 300.

The library device 300 includes a storage rack 310 storing the tape cartridges 400, a carry out/in port 320 for carrying the tape cartridges 400 out of the library device 300 and for carrying the tape cartridges 400 into the library device 300, a tape drive 330 that reads information from the tape cartridges 400 stored in the storage rack 310 and that records information onto the tape cartridges 400, a transfer mechanism 340 that transfers the tape cartridges 400 stored in the storage rack 310 to the carry out/in port 320 and the tape drive 330, and a control circuit 350 that comprehensively controls the library device 300.

The control circuit 350 is connected to the management computer 110 and an operation panel not illustrated, and reading and recording of information from and onto the tape cartridges 400 and carrying the tape cartridges 400 in and out of the library device 300 are performed by the user through operations on the management computer 110 and the operation panel.

The transfer mechanism 340 includes a holding mechanism 341 that holds the tape cartridges 400. When the user inputs the identification number of a tape cartridge 400 that the user desires to carry out, the holding mechanism 341 holds the tape cartridge 400 with the inputted identification number in the storage rack 310.

The path through which the tape cartridge 400 passes when the holding mechanism 341 transfers the tape cartridge 400 between the storage rack 310 and the carry out/in port 320 is equivalent to a gateway of the storage rack 310. In the present embodiment, the holding mechanism 341 includes a function of performing wireless communication with the RFID tags mounted on the tape cartridges 400 as in the check device 121 and the check gate 210, and the checking of identification numbers and the transmission of destruction signals are performed through the holding mechanism 341.

In the library device 300, a combination of the tape cartridge 400, the holding mechanism 341, and the control circuit 350 is equivalent to a specific embodiment of the takeout management system, the holding mechanism 341 is equivalent to an example of the gateway side communication section in the basic mode of the takeout management system, and the control circuit 350 is equivalent to an example serving both as the determination section and the sending section in the basic mode.

Figure 6:
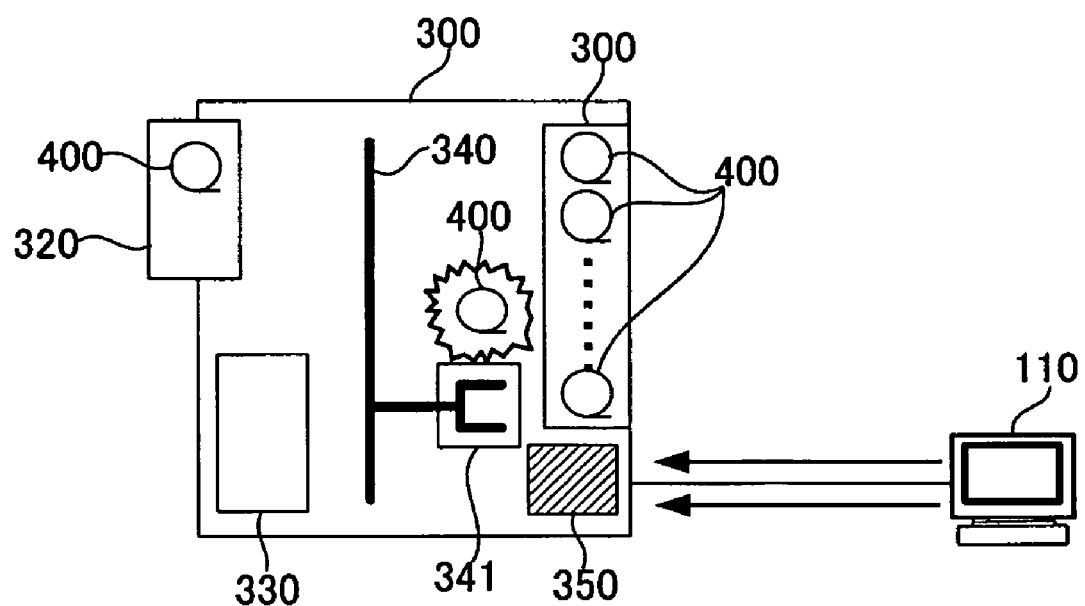
FIG. 6 is a schematic diagram illustrating a situation of checking an identification number in the library device 300.

FIG. 6 is a schematic diagram illustrating a situation of checking the identification number in the library device 300.

In the library device 300, when the user instructs carrying out of a desired tape cartridge 400 by an operation, the holding mechanism 341 of the transfer mechanism 340 holds the desired tape cartridge 400 and transfers the tape cartridge 400 to the carry out/in port 320. During the transfer, the identification number for the tape cartridge 400 held by the holding mechanism 341 is checked. The holding mechanism 341 is connected to the control circuit 350, and checking of the identification number is performed by the control circuit 350 through the holding mechanism 341.

First, when the holding mechanism 341 holds the tape cartridge 400, the control circuit 350 wirelessly queries the tape cartridge 400 currently held by the holding mechanism 341 for the identification number through the holding mechanism 341. The control circuit 350 then receives the identification number wirelessly sent from the tape cartridge 400 in response to the query through the holding mechanism 341.

The control circuit 350 is notified in advance by the management computer 110 of the identification numbers targeted for leakage prevention. The control circuit 350 then compares the identification number received through the holding mechanism 341 with the currently registered identification numbers targeted for leakage prevention to check whether the received identification number is an identification number targeted for leakage prevention. If the identification number is an identification number targeted for leakage prevention, the control circuit 350 sends the destruction signal to the tape cartridge 400 through the holding mechanism 341. As a result, the magnetic tape in the tape cartridge 400 recording the confidential information is destroyed, and leakage of the confidential information from the library device 300 can be prevented.

As described above, in the present embodiment, leakage of confidential information is prevented in each of three stages in takeout of the tape cartridge 400: a stage in which the tape cartridge 400 exits the library device 300; a stage in which the tape cartridge 400 exits the computer room 200; and a stage in which the tape cartridge 400 exits the computer center 100. Incidentally, the leakage prevention is basically performed at the stage in which the tape cartridge 400 exits the library device 300. However, for example, when the tape cartridge 400 is taken out in a state in which the power source of the library device 300 is turned off during maintenance and the like, or when a suspicious individual destroys the library device 300 to forcibly take out the tape cartridge 400, there is a high possibility that the leakage prevention in the library device 300 is not performed. In the present embodiment, in view of such cases, the checks are performed in the three stages before the tape cartridge 400 exits the computer center 100. Furthermore, as described above, the check at the checkpoint 120 of the computer center 100 of the last stage is performed under the surveillance of the guard to make the check more complete.

Next, details of the tape cartridge 400 will be described.

Figure 7:
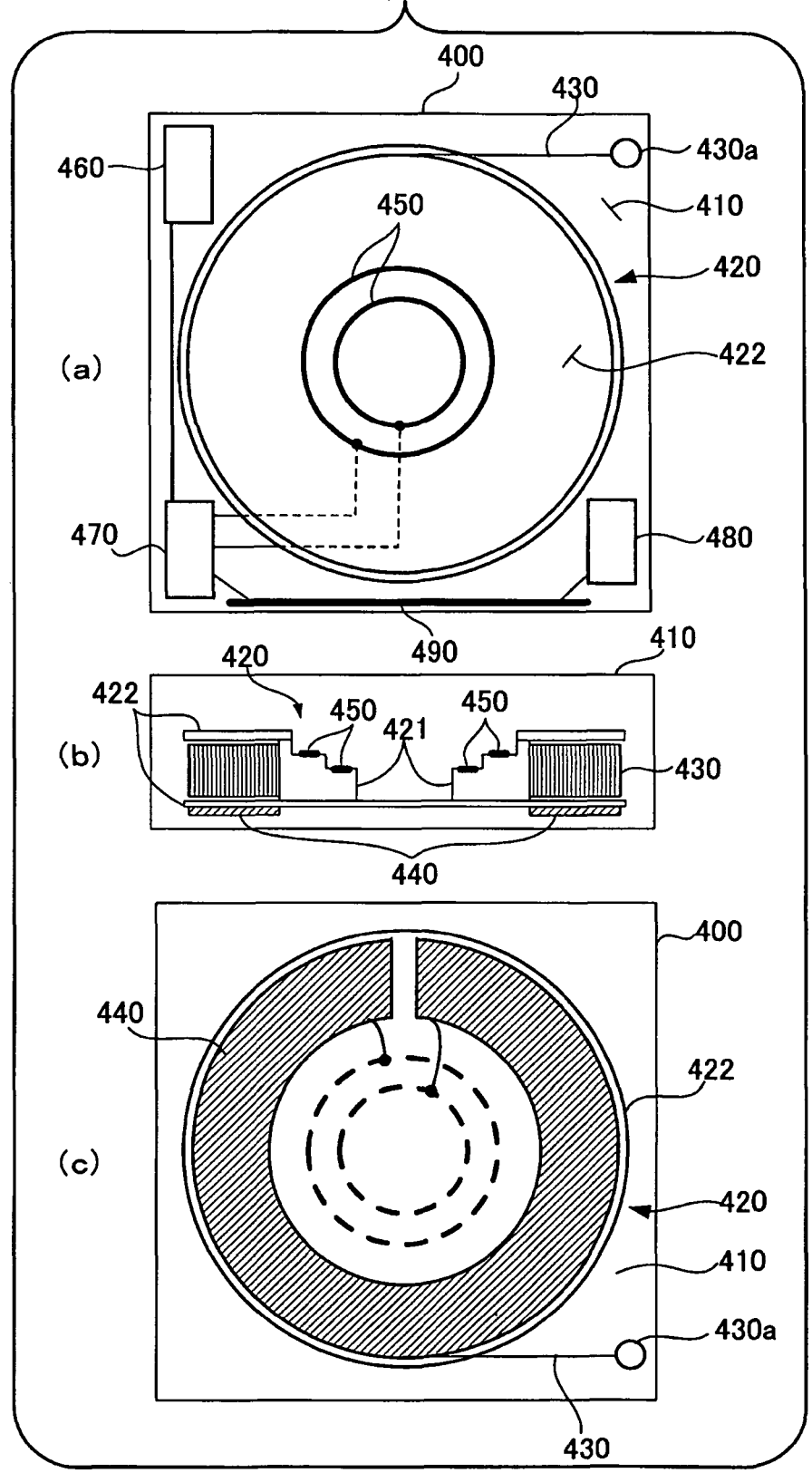
FIG. 7 is a diagram illustrating an internal structure of a tape cartridge 400.

FIG. 7 is a diagram illustrating an internal structure of the tape cartridge 400.

Part (a) of FIG. 7 illustrates a top plan view of the tape cartridge 400 in a state in which the internal structure is seen through, Part (b) illustrates a cross-sectional view of the tape cartridge 400, and Part (c) illustrates a bottom plan view in a state in which the internal structure is seen through.

The tape cartridge 400 includes a rectangular-shaped cartridge case 410, a reel body 420, and a magnetic tape 430. The reel body 420 includes a reel shaft 421 where the magnetic tape 430 is taken up and two disc-shaped frame plates 422 that sandwich the taken up magnetic tape 430 and that face each other in a direction along the reel shaft 421. The magnetic tape 430 is taken up by the reel shaft 421 of the reel body 420, and the reel body 420 is included in the cartridge case 410. The magnetic tape 430 is equivalent to an example of the recording medium in the basic modes of the recording medium cartridge and the takeout management system, and the reel body 420 is equivalent to an example of the reel body in an application mode of the recording medium cartridge.

Furthermore, in the present embodiment, as illustrated in Part (b) and Part (c), a sheet-shaped heater 440 having a partially-cut ring shape is attached to the frame plate 422 of the lower side. As illustrated in Part (a) and Part (b), positive and negative two electrodes 450 are arranged on the upper side at the thickness part of the reel shaft 421, and as illustrated in Part (c), both ends of the heater 440 are connected to the two electrodes 450, respectively.

As illustrated in Part (a), the tape cartridge 400 includes a power source 460, a heater driving circuit 470 that receives the destruction signal to supply electric power from the power source 460 to the heater 440, a memory 480 that stores the identification number of the tape cartridge 400, and an RFID tag 490 that receives a destruction signal wirelessly sent from the outside and transmits the destruction signal to the heater driving circuit 470 and that wirelessly answers the identification number stored in the memory 480 when the identification number is wirelessly queried from the outside.

The RFID tag 490 is equivalent to an example of the communication section in the basic mode of the recording medium cartridge and is also equivalent to an example of the medium side communication section in the basic mode of the takeout management system. A combination of the heater 440 and the heater driving circuit 470 is equivalent to an example of the destruction mechanism in the basic modes. The heater 440 is equivalent to an example of the heating element in an application mode of the recording medium cartridge, and the heater driving circuit 470 is equivalent to an example of the electric power supply section in the application mode. A combination of the memory 480 and the RFID tag 490 is equivalent to an example of the identification name responding section in an application mode of the takeout management system.

In the present embodiment, when the check device 121, the check gate 210, and the holding mechanism 341 wirelessly query the identification number, the RFID tag 490 wirelessly answers the identification number in the memory 480. When the destruction signal is wirelessly sent from the check device 121, the check gate 210, and the holding mechanism 341, the RFID tag 490 receives the destruction signal and transmits the destruction signal to the heater driving circuit 470. In response to the destruction signal, the heater driving circuit 470 supplies electric power from the power source 460 to the heater 440 through the two electrodes 450. Consequently, the heater 440 generates heat, and the edge part of the lower side of the magnetic tape 430 taken up by the reel body 422 is heated. The heat deforms or welds the edge part of the magnetic tape 430 made of resin. As a result, reading of information from the tape cartridge 400 becomes impossible as described above below, and the leakage of confidential information is prevented.

First, a tape drive used to read information from the tape cartridges 400 will be described.

Figure 8:
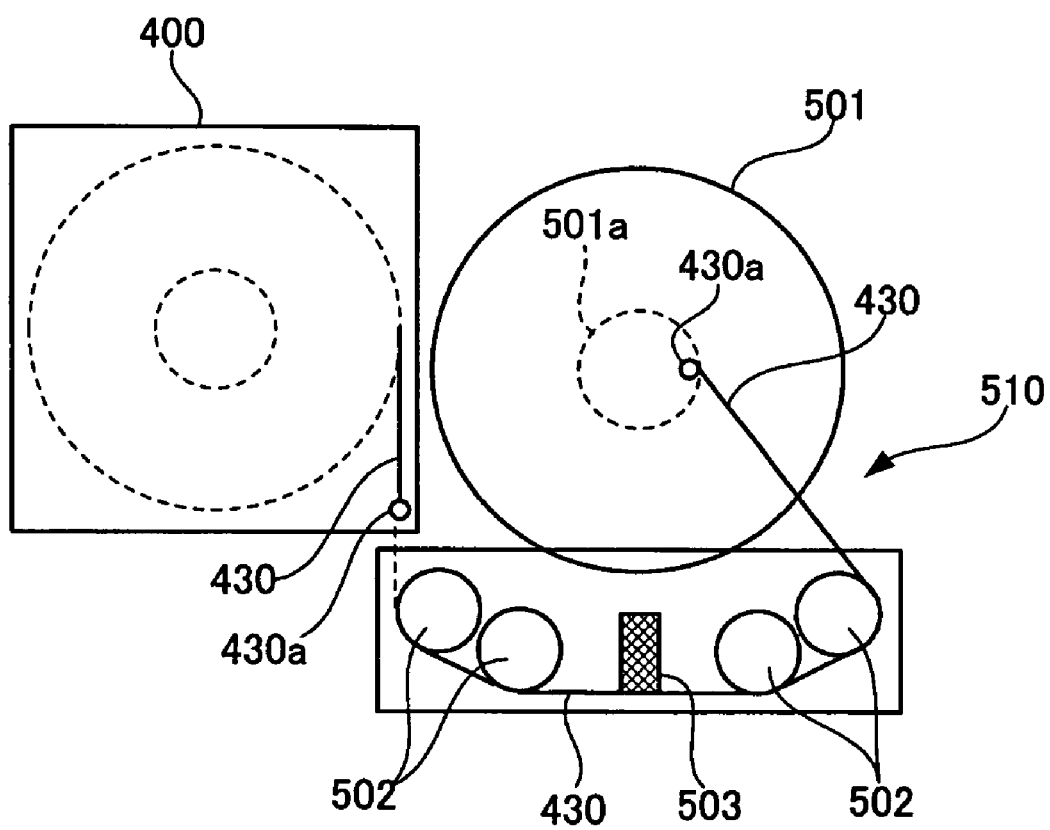
FIG. 8 is a diagram illustrating an example of a tape drive.

FIG. 8 is a diagram illustrating an example of the tape drive.

FIG. 8 illustrates a tape drive 510 that reads information from the magnetic tape 430 and that records information on the magnetic tape 430. Although the tape drive 330 included in the library device 300 in FIG. 5 is a device different from the tape drive 510 in FIG. 8, the tape drive 330 has the same structure as the structure of the tape drive 510 in FIG. 8. The tape drive 510 in FIG. 8 includes a take-up reel 501 that takes up the magnetic tape 430 extracted from the tape cartridge 400, a guide roll 502 that guides the magnetic tape 430 from the tape cartridge 400 to the take-up reel 501, and a magnetic head 503 that reads and records information from and onto the magnetic tape 430 in the middle of the guide.

As illustrated also in FIG. 7, a reader pin 430a that serves as a key to extract the magnetic tape 430 from the tape cartridge 400 is attached to the leading end of the magnetic tape 430. When the tape drive 510 reads information of the tape cartridge 400, the reader pin 430a is first extracted by a thread mechanism not illustrated and attached to a take-up shaft 501a of the take-up reel 501. Subsequently, the take-up reel 501 rotates, and the magnetic tape 430 is taken up by the take-up shaft 501a. In accordance with the taking up, the magnetic head 503 reads or records information from and onto the magnetic tape 430 that passes just below.

Reading of information from a normal tape cartridge 400 is executed through the above-described process by the tape drive 510. However, reading of information from a destroyed tape cartridge 400, in which the magnetic tape 430 is deformed or welded by heating, fails as follows.

First, when the magnetic tape 430 is welded, the extraction of the magnetic tape 430 fails in the tape drive 510.

Figure 9:
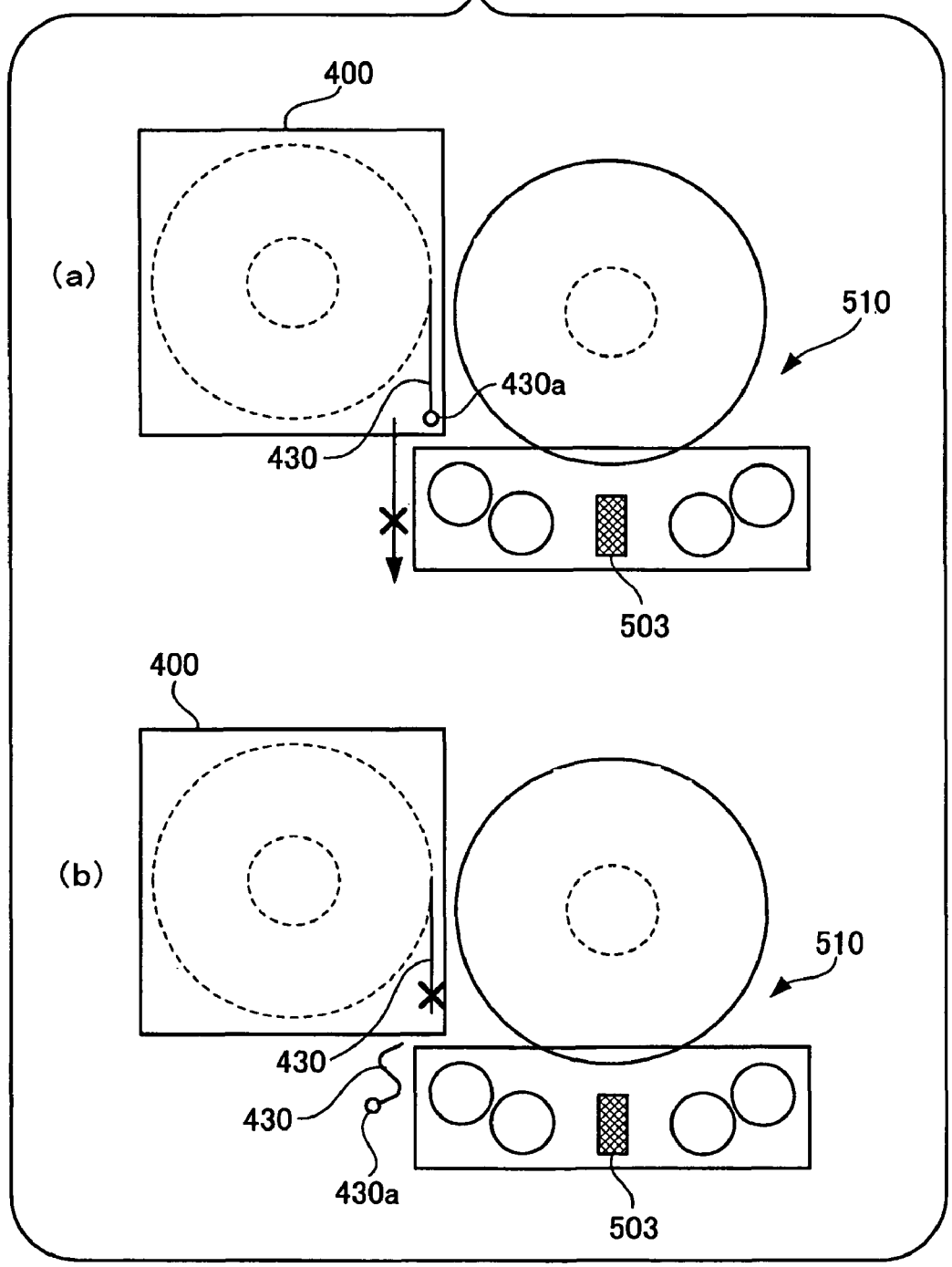
FIG. 9 is a diagram illustrating a situation of failing to extract a magnetic tape 430 from a destroyed tape cartridge 400.

FIG. 9 is a diagram illustrating a situation of failing to extract the magnetic tape 430 from the destroyed tape cartridge 400.

Part (a) of FIG. 9 schematically illustrates a situation in which a welded magnetic tape 430 does not exit from the tape cartridge 400 even if the thread mechanism not illustrated grabs and pulls the reader pin 430a of the magnetic tape 430. Part (b) of FIG. 9 schematically illustrates a situation in which the welded magnetic tape 430 is torn as a result of being forcibly pulled.

In this way, when the magnetic tape 430 is welded, the tape drive 510 fails to extract the magnetic tape 430, and the magnetic tape 430 cannot be carried to the magnetic head 503.

On the other hand, when the magnetic tape 430 is deformed, although the magnetic tape 430 can be extracted, reading of information by the magnetic head 503 fails subsequently.

Figure 10:
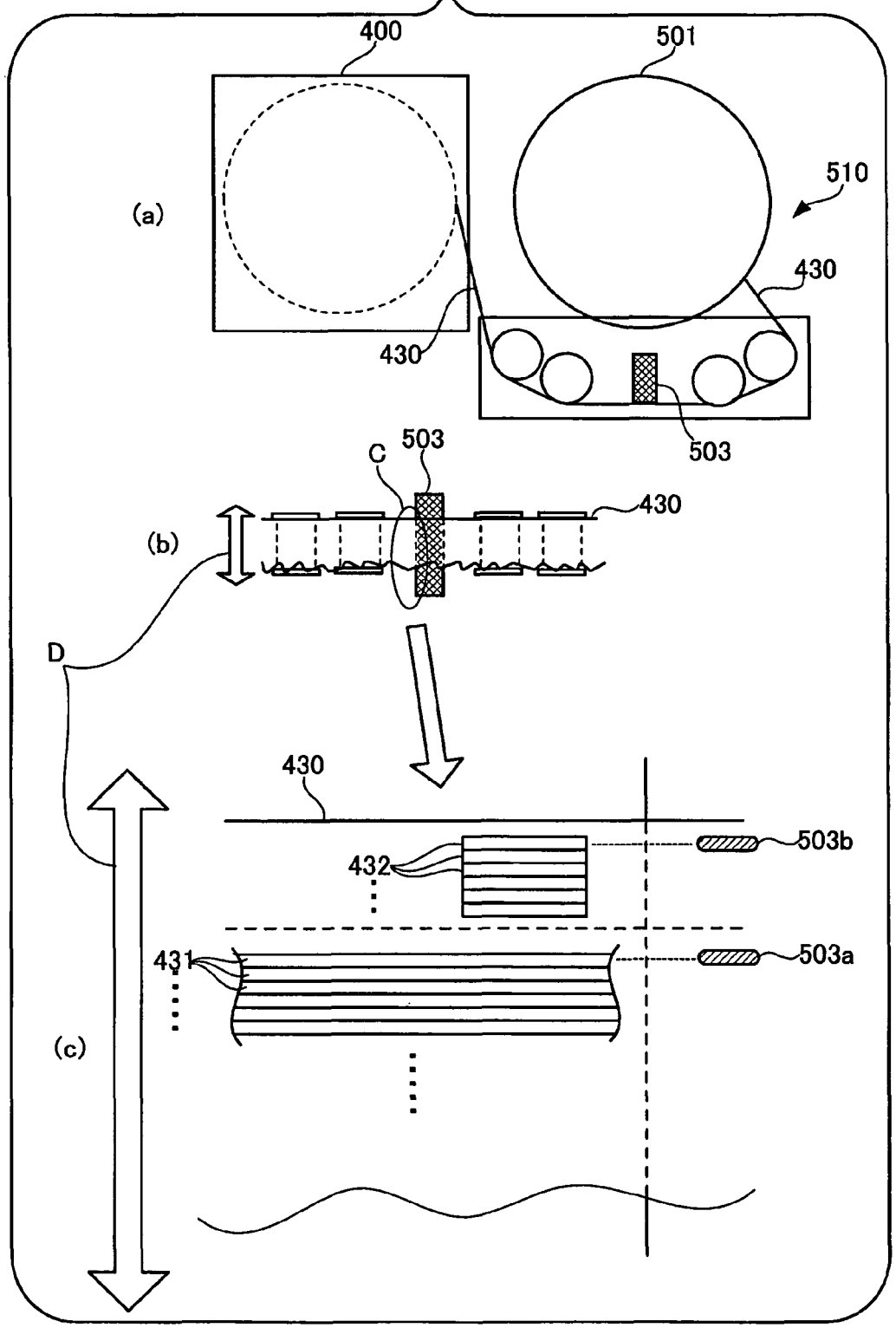
FIG. 10 is a diagram illustrating a situation of failing to read information from a deformed magnetic tape 430.

FIG. 10 is a diagram illustrating a situation of failing to read information from a deformed magnetic tape 430.

Part (a) of FIG. 10 illustrates a situation in which the deformed magnetic tape 430 is extracted from the tape cartridge 400 and taken up by the take-up reel 501, and the magnetic tape 430 passes just below the magnetic head 503. Part (b) illustrates a diagram of the magnetic head 503 and the magnetic tape 430 in this state as seen from the lower side. Part (c) illustrates an enlarged view of an area C in Part (b).

When the magnetic tape 430 is merely deformed, as illustrated in Part (a) of FIG. 10, the magnetic tape 430 can be extracted and taken up by the take-up reel 501. However, in this case, the magnetic tape 430 passing just below the magnetic head 503 vibrates in a direction illustrated by an arrow D in FIG. 10 due to the deformation formed on the lower side of the tape cartridge 400 among the edges of the magnetic tape 430.

As illustrated in Part (c) of FIG. 10, the magnetic tape 430 includes recording tracks 431, each of which records information, and servo tracks 432 that correspond one to one with the recording tracks 431 and that record servo information used to position the magnetic head 503 relative to the corresponding recording track 431. Meanwhile, the magnetic head 503 includes an information head 503a that reads information from the recording tracks 431 and a servo head 503b that reads servo information from the servo tracks 432 to position the information head 503 relative to the recording track 431. The width of the recording tracks 431 and the servo tracks 432 is 11 to 19 μm, which is an extremely narrow width. On the other hand, the vibration caused by the deformation of the magnetic tape 430 is far greater than the width. As a result, the positioning of the information head 503 relative to the recording track 431 cannot be accurately performed, and consequently, reading of information fails.

As described above, as for the destroyed tape cartridge 400 that is welded or deformed, reading of information fails, and leakage of confidential information is prevented.

Incidentally, the sheet-shaped heater 440 having a partially-cut ring shape depicted in FIG. 7 has been illustrated as an example of the heating element in an application mode of the recording medium cartridge. However, the heating element is not limited to this example and may be, for instance, the following alternative examples.

Figure 11:
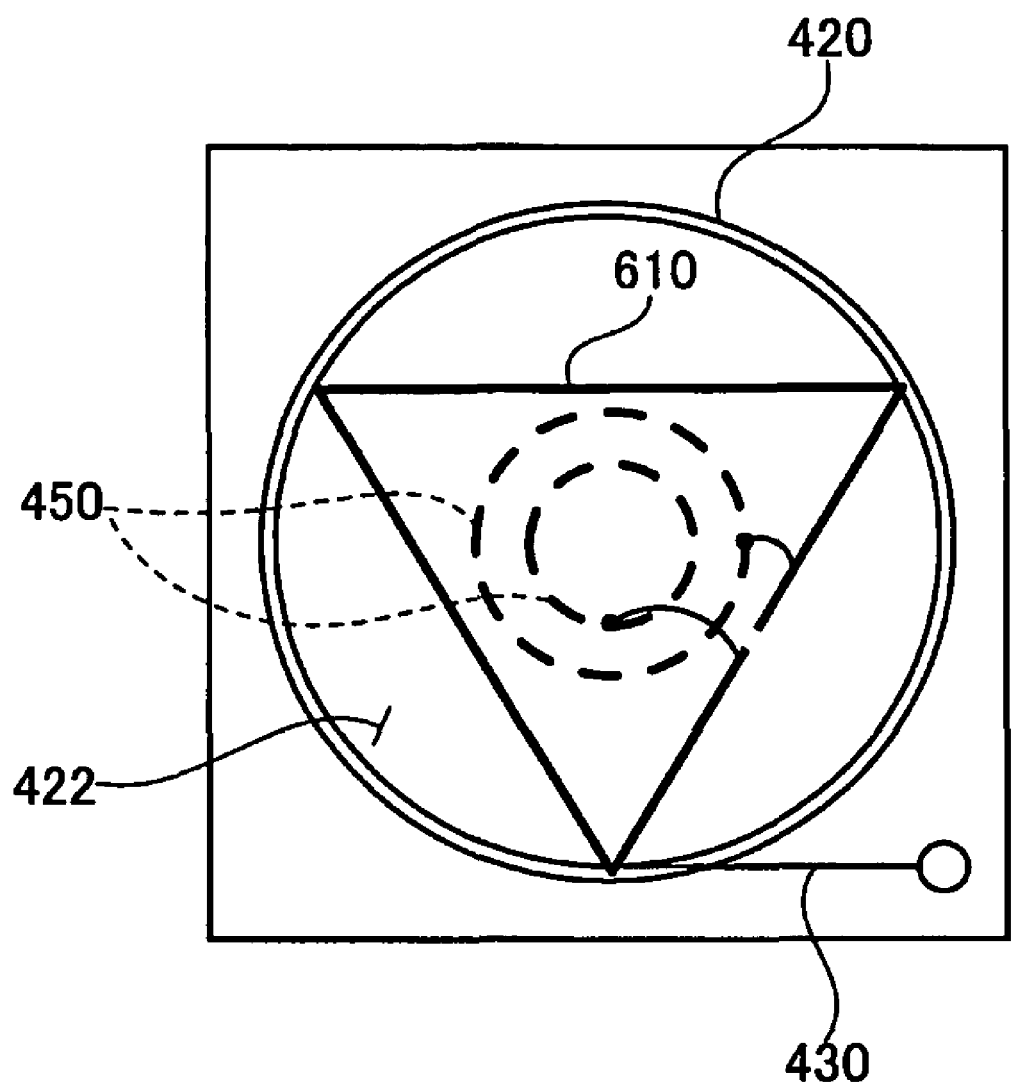
FIG. 11 is a diagram illustrating a first alternative example of a heat element.
Figure 12:
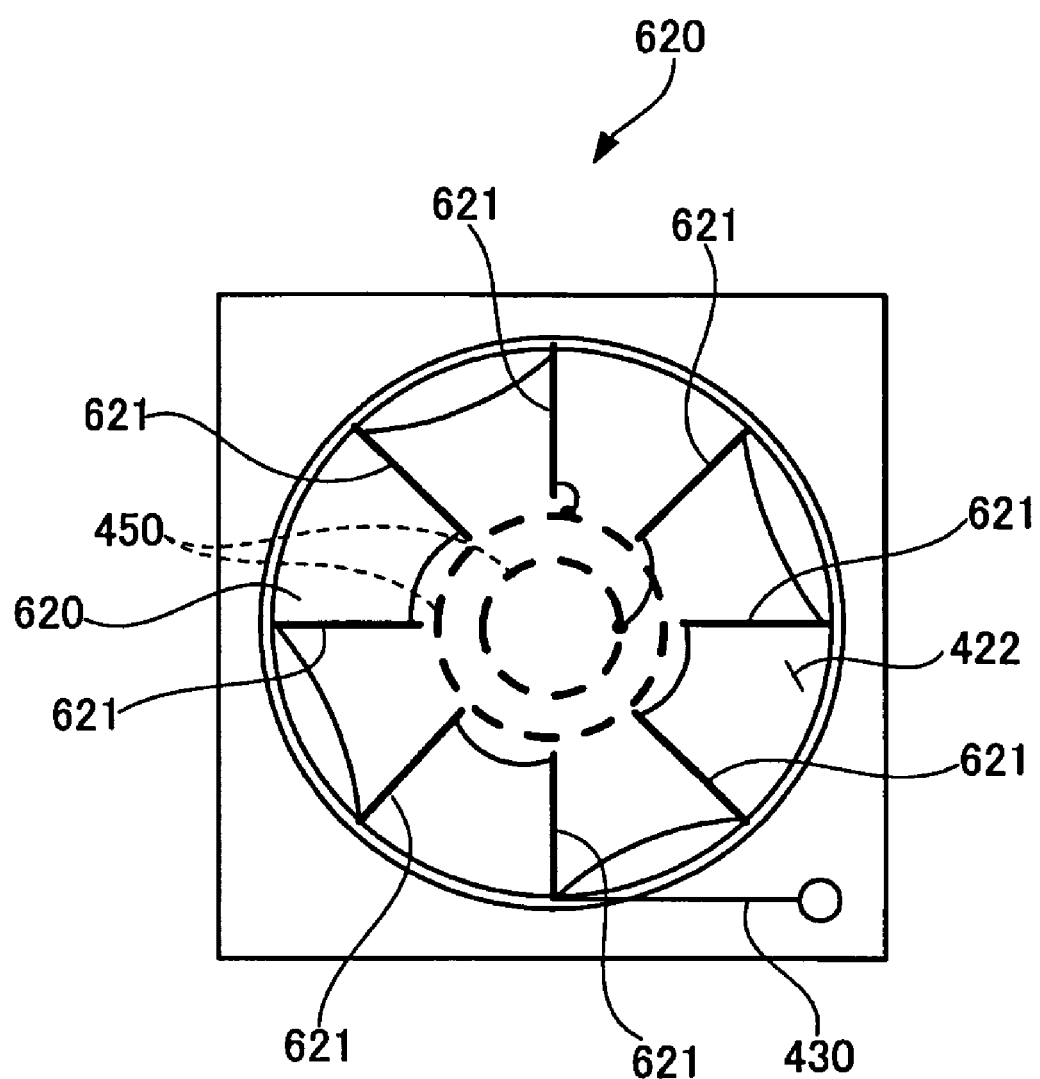
FIG. 12 is a diagram illustrating a second alternative example of the heating element.
Figure 13:
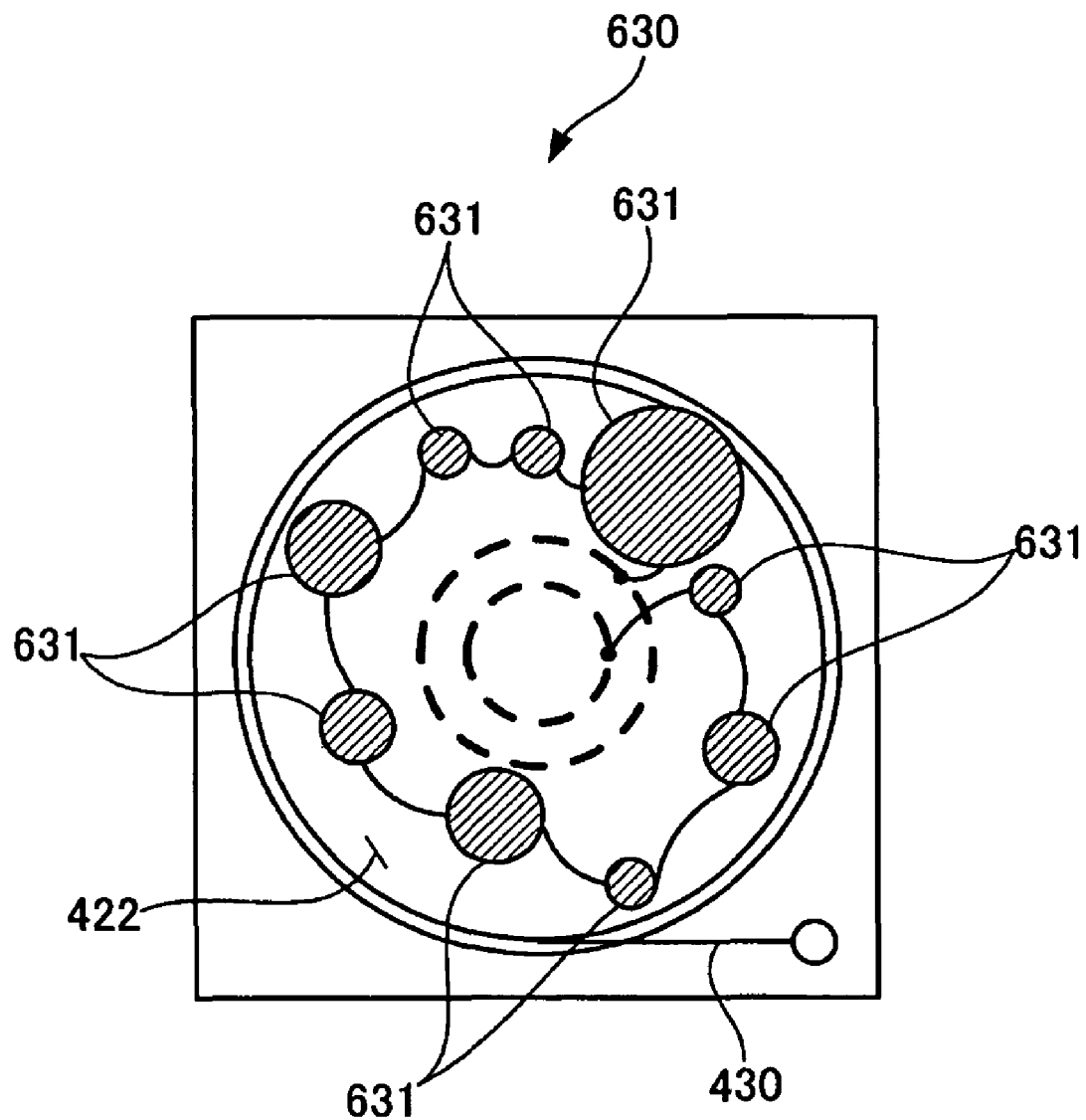
FIG. 13 is a diagram illustrating a third alternative example of the heat element.

FIG. 11 is a diagram illustrating a first alternative example of the heating element, FIG. 12 is a diagram illustrating a second alternative example of the heating element, and FIG. 13 is a diagram illustrating a third alternative example of the heating element. In FIGS. 11 to 13, constituent elements equivalent to the constituent elements illustrated in FIG. 7 are designated with the same reference numerals as in FIG. 7, and overlapped descriptions of the equivalent constituent elements will not be repeated below.

The first alternative example illustrated in FIG. 11 is one heater line 610, and as illustrated in FIG. 11, each vertex reaches the outer edge of the reel body 420. The heater line 610 is attached to the frame plate 422 of the reel body 420 in a state in which the heater line 610 is bent into a triangular shape so as to cross the layers of the magnetic tape 430 taken up by the reel body 420, and both ends are connected to the two electrodes 450.

The second alternative example illustrated in FIG. 12 is a heater group 620 that radially extends from the center of the reel body 420 so as to cross the layers of the magnetic tape 430 taken up by the reel body 420 and that is formed by eight heater lines 621 electrically connected to each other in series. Heater lines 621 at both sides in the serial connection are connected to the two electrodes 450.

The third alternative example illustrated in FIG. 13 is a heater group 630 formed by sheet-like heaters 631 that are scattered on the frame plate 422 and that are electrically connected to each other in series. Each of the heaters 631 is shaped like a plane, the plane produces heat, and the plane producing the heat faces the magnetic tape 430 taken up by the reel body 420. The heater lines 631 at both ends in the serial connection are connected to the two electrodes.

In all three types of alternative examples, the magnetic tape 430 is partially heated so that the edge on the lower side of the magnetic tape 430 across a wide range in a length direction of the magnetic tape 430 is heated, which is efficient.

As described above, according to the present embodiment, before the tape cartridge 400 stored in the storage rack 310 in the library device 300 exits the computer center 100, checking of whether the information recorded in the tape cartridge 400 is confidential information and provision of a instruction to destruct the magnetic tape 430 when the information is confidential information are executed through three stages. As a result, even if a suspicious individual coercively takes out the tape cartridge 400 recording the confidential information, reading of the information from the tape cartridge 400 becomes impossible, and leakage of the confidential information is surely prevented.

Although the magnetic tape 430 has been taken as an example of the recording medium in the basic modes of the recording medium cartridge and the takeout management system, the recording medium is not limited to this example and may be, for example, a DVD, a CD, or an MO.

Although the mechanism that thermally destroys the magnetic tape 430 has been taken as an example of the destruction mechanism in the basic modes of the recording medium cartridge and the takeout management system, the destruction mechanism is not limited to this example and may be, for example, a mechanism that mechanically destroys the recording medium such as the magnetic tape 430 and the DVD by disconnection, cutting, or the like.

Although the heater attached to only one of the two frame plates 422 of the reel body 420 has been taken as an example of the heating element in an application mode of the recording medium cartridge, the heating element is not limited to this example. The heating element may be, for example, a heater or the like that is attached to both of the two frame plates 422.

Although the method of comparing the identification name of the tape cartridge 400 targeted for determination with the identification name of the tape cartridge 400 prohibited for taking out has been taken as an example of the determination performed by the determination section in the basic modes of the recording medium cartridge and the takeout management system, the determination is not limited to this example. The determination may be, for example, a method in which the tape cartridge 400 targeted for determination wirelessly declares whether takeout of the tape cartridge 400 is prohibited, and the declaration is wirelessly received.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A recording medium cartridge comprising:
a recording medium that is a magnetic tape that records information;
a reel body including a central shaft that takes up the recording medium and two frame plates that sandwich the taken up recording medium and face each other in a direction along the central shaft;
a communication section that performs communications wirelessly; and
a destruction mechanism that destroys, in response to reception of a predetermined wireless signal in the communication section, the recording medium at least to the extent that reading of information by a reading device that reads information from the recording medium is impossible, the destruction mechanism comprising:
a heating element that is attached to at least one of the two frame plates and supplied with electric power to generate heat, and
an electric power supply section that supplies electric power to the heating element in response to the reception of the wireless signal in the communication section.

2. The recording medium cartridge according to claim 1, wherein the destruction mechanism destroys the recording medium by heat.

3. The recording medium cartridge according to claim 1, wherein the heating element is attached to a part of the frame plate and crosses layers of the recording medium taken up by the central shaft.

4. The recording medium cartridge according to claim 1 wherein the heating element is a heater line that extends in a direction crossing the layers of the recording medium taken up by the central shaft, on the frame plate.

5. The recording medium cartridge according to claim 1, wherein the heating element is a plurality of heater lines that radially extend from the central shaft, on the frame plate.

6. The recording medium cartridge according to claim 1, wherein the heating element is a plurality of heaters that are scattered on the frame plate, each of the heaters having a plane shape and a surface that generates heat, and the surface that generates the heat facing the recording medium taken up by the central shaft.

7. A takeout management system that manages takeout of one or more recording medium cartridges each including a recording medium that is a magnetic tape that records information, from a storage location where the recording medium cartridges are stored, wherein:
the recording medium cartridge comprises:
the recording medium,
a reel body including a central shaft that takes up the recording medium and two frame plates that sandwich the taken up recording medium and face each other in a direction along the central shaft,
a medium side communication section that performs communications wirelessly, and
a destruction mechanism that destroys, in response to reception of a predetermined wireless signal in the medium side communication section, the recording medium at least to the extent that reading of information by a reading device that reads information from the recording medium is impossible, the destruction mechanism comprising:
a heating element that is attached to at least one of the two frame plates and supplied with electric power to generate heat, and
an electric power supply section that supplies electric power to the heating element in response to the reception of the wireless signal in the communication section, and
the takeout management system comprises:
a gateway side communication section that is installed at a gateway to the storage location and wirelessly communicates with the medium side communication section of the recording medium cartridge passing through the gateway;
a determination section that determines whether the recording medium cartridge passing through the gateway is a recording medium cartridge prohibited from being taken out of the storage location, based on a content of communication with the medium side communication section by the gateway side communication section; and
a sending section that sends, through the gateway side communication section, the wireless signal to the recording medium cartridge determined by the determination section to be the recording medium cartridge prohibited from being taken out of the storage location.

8. The takeout management system according to claim 7, wherein the recording medium cartridge comprises:
an identification name responding section that includes an identification name that distinguishes the recording medium cartridge from other recording medium cartridges and answers the identification name through the medium side communication section when the identification name is queried through the medium side communication section, and
the determination section includes an identification name of the recording medium cartridge prohibited from being taken out of the storage location, gives the recording medium cartridge passing through the gateway a query through the gateway side communication section to find the identification name, and determines whether the identification name answered by the identification name responding section in response to the query matches an identification name of the recording medium cartridge prohibited from being taken out.

* * * * *